United States Patent [19]

Sorg et al.

[11] Patent Number: 4,582,033
[45] Date of Patent: Apr. 15, 1986

[54] METHOD OF AND DEVICE FOR CONTROLLING FUEL INJECTION IN INTERNAL COMBUSTION ENGINES

[75] Inventors: Wilhelm Sorg, Markgröningen; Ulrich Steinbrenner, Stuttgart, both of Fed. Rep. of Germany

[73] Assignee: Robert Bosch GmbH, Stuttgart, Fed. Rep. of Germany

[21] Appl. No.: 713,265

[22] Filed: Mar. 18, 1985

[30] Foreign Application Priority Data

Apr. 18, 1984 [DE] Fed. Rep. of Germany ....... 3414681

[51] Int. Cl.$^4$ .......................... F02P 5/04; F02B 3/00
[52] U.S. Cl. .................................. 123/406; 123/494; 123/419; 123/425; 123/435; 123/436; 123/501; 123/478
[58] Field of Search .............. 123/494, 419, 425, 426, 123/435, 436, 463, 501, 472, 478, 406

[56] References Cited

U.S. PATENT DOCUMENTS

| 4,377,145 | 3/1983 | Nagaishi | 123/494 |
| 4,449,501 | 5/1984 | Greeves | 123/501 |
| 4,485,791 | 12/1984 | Sugo | 123/501 |
| 4,513,721 | 4/1985 | Ina | 123/436 |
| 4,527,523 | 7/1985 | Daumer | 123/436 |

*Primary Examiner*—Ronald B. Cox
*Attorney, Agent, or Firm*—Michael J. Striker

[57] ABSTRACT

A method and a device for controlling fuel injection in multi-cylinder internal combustion engines, includes means for computing a time shift of a common time point for ignition start in respective cylinders to a new value at which pressure differentials in respective intake pipes are approximately equal and consequently λ-dispersion is minimized.

5 Claims, 5 Drawing Figures

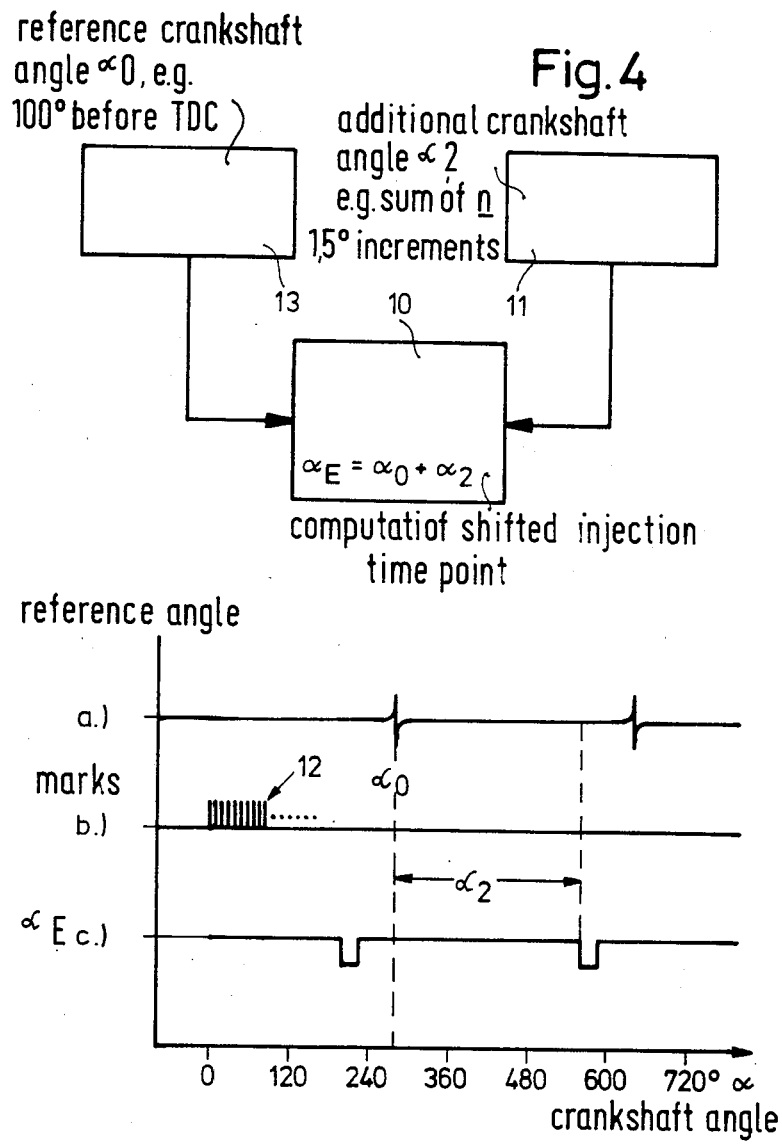

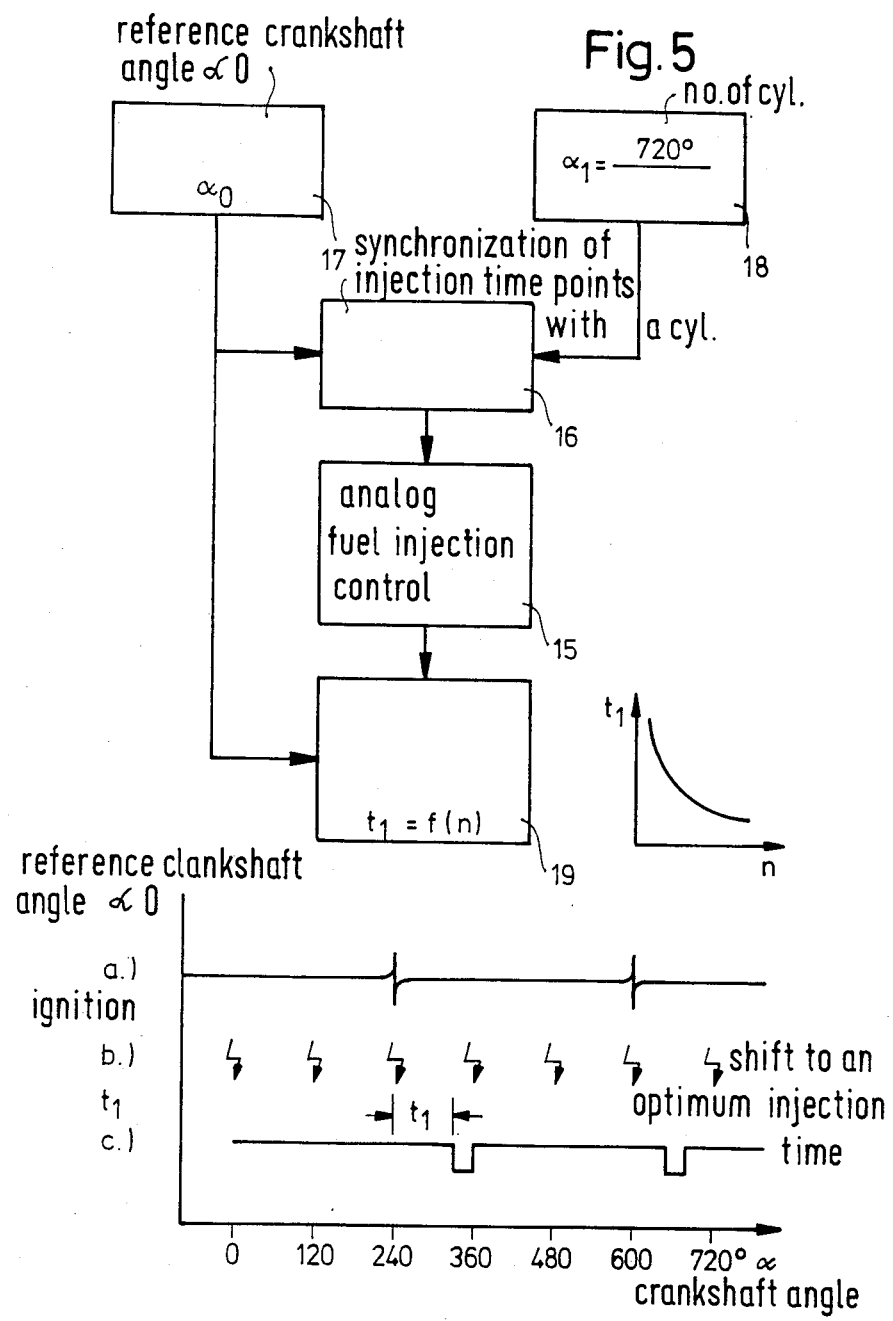

METHOD OF AND DEVICE FOR CONTROLLING FUEL INJECTION IN INTERNAL COMBUSTION ENGINES

BACKGROUND OF THE INVENTION

The present invention relates to a method of and a device for controlling fuel injection in a multi-cylinder internal combustion engine having individual throttle valve controls for each cylinder and producing in response to predetermined crankshaft angles at least two fuel injections during a complete working cycle of a cylinder (suction, compression, explosion, discharge).

In a published European Patent Application No. 0069 386 (A2) a fuel injection system is described in which in the case of a four stroke engine fuel is injected into a first group of cylinders at a common time point whereas for a second group of cylinders fuel injection time is shifted by 180° relative to the time point of the first group whereby two fuel injections related to the rotary speed of the crankshaft take place per a working cycle of each cylinder. In other words, a fuel injection occurs once per revolution of the crank shaft and inasmuch in the case of a four stroke engine the working cycle extends over two crankshaft rotations, the fuel injection occurs twice per 720° position on the crankshaft.

In known fuel injection systems it has been assumed that in engines provided with individual throttle valve controls (a throttle valve per each cylinder) the pressure variations in intake pipe and hence the effective pressure differentials at the metering gap of respective fuel injection valves are very large with respect to the angle of crankshaft, when compared with conventional engines which have only a single throttle valve in the intake manifold. Such considerable intake pressure variations which periodically repeat after 720° of the crankshaft are particularly strong in engines provided with four injection valves. In conventional fuel injection systems the end effect of such excessive intake pressure variations is the fact that in the usual simultaneous electrical actuation of all fuel injection valves, for example, the before-mentioned fuel injection per one revolution, different fuel injection doses are produced at respective metering gaps of the injection valves and these differences in the metered fuel quantity do not become equalized during a complete working cycle (0° to 720° of crankshaft position) of the cylinder. As a consequence, λ-dispersions of unacceptable magnitude will occur between the individual cylinders. Such λ-dispersions can amount up to 5% deviations in the preset mixture ratios and when considering the resulting degree of pollution and also when considering the possibility of highly accurate operation of digital fuel injection systems, such erratic values cannot be tolerated.

The cause of such excessive λ-dispersions in multicylinder engines equipped with individual throttle valve controls for each cylinder is to be seen of course in the fact that a 720° of crankshaft fuel is injected in all cylinders only twice. Therefore, in the case of uniform distribution and origin of movements of inlet and discharge valves in respective cylinders, non-uniform pressure differentials in the range of respective intake pipes are encountered when the injection time points are set at about 0° (720°) and 360° of crankshaft at which angular positions, in the case of a four stroke engine, always only a single cylinder starts its suction stroke. In the case of a six cylinder engine, the injection time points are correspondingly shifted per 720° range of the crankshaft in a periodic repetition for example at about 250° and 310° at which angular positions of the crankshaft also only a single cylinder initiates a suction stroke.

In prior art fuel injection systems attempts were made to avoid the disadvantages of excessive λ-dispersion between the individual cylinders in such a manner that per 720° of crankshaft (in a four stroke engine) altogether four injections take place whereby groups of cylinders are combined in such a manner that a uniform fuel distribution to individual cylinders will result. This prior art arrangement however has the disadvantage that already in a four stroke engine it is necessary to employ two end stages controlled at different times inasmuch the fuel injections occur in a 180° spacings and in the case of a six cylinder engine there are accordingly needed three end stages to avoid non-symmetrical operation.

SUMMARY OF THE INVENTION

It is therefore a general object of the present invention to overcome the aforementioned disadvantages.

More particularly, it is an object of the invention to provide an improved fuel injection control in multi-cylinder engines which results in substantial reduction of λ-dispersions.

Another object of this invention is to provide such an improved injection control which does not require increased construction costs and which maintains the basic principle of injecting fuel into respective cylinders always at the same time points.

In keeping with these objects and with others which will become apparent hereafter, one feature of the invention resides, in a fuel injection controlling method of the before-described kind, in the steps of measuring effective differential pressures in intake pipes, and shifting a common injection start point of all cylinders relative to start points of respective strokes in the working cycles to angular positions of the crankshaft at which effective differential pressures in intake pipes of individual cylinders have minimum deviations from each other.

The fuel injection controlling device of this invention comprises a digital computer and, connected to the computer, means for detecting angular position of the crankshaft, means for detecting pressure differentials in intake pipes, means for determining from the angular position of the crankshaft a common point $\alpha 0$ for the start of fuel injection in all cylinders and means for shifting the common time point to such an angular position $\alpha 2$ of the crankshaft at which the pressure differentials in all intake pipes are substantially equal.

This invention has the advantage that by using a standard digital fuel injection system which already includes a digital computer no changes in the hardware of these systems are necessary to achieve the effect of this invention and, consequently a particularly economic solution is obtained. Moreover, the invention succeeded in situating the time point for injection in a relatively flat region of the courses of intake pressure in all cylinders so that an increased accuracy is obtained.

The system of this invention is suited for providing a sufficient and correct fuel distribution to individual cylinders in such a way that the theoretically still possible λ-dispersions can be reduced by more than half and this advantage can be obtained in contemporary fuel injection systems only with minute modifications.

It is of particular advantage especially in six cylinder engines to shift the two common injection points for all cylinders about an angle of 60° of the crankshaft rotation so that by means of this preliminary shifting of all time points a region is reached in which substantially lower pressure differentials between the individual cylinders are present.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 4 is a functional block circuit diagram of this invention in a digital fuel injection system shown in conjunction with a time plot of signals generated in respective blocks; and FIG. 5 is also a functional block circuit diagram of this invention in connection with a fuel injection system operating at least partially on analog basis.

DESCRIPTION OF THE PREFERRED EMBODIMENTS

The essence of this invention is the shift of the common injection time points in a multi-cylinder engine provided with throttle valve controls for respective cylinders, in such a manner that the fuel injection time points common to all cylinders are assigned to those angular positions of the crankshaft at which the individual cylinders exhibit their smallest relative pressure differential values in their intake pipes. In other words, the beginning of the fuel injection is changed with respect to conventional common time points which usually are adjusted to the beginning of suction strokes of certain cylinders, the change corresponding to a predetermined value of the crankshaft angle at which a drastic reduction of λ-dispersion of individual cylinders of the engine can be obtained. According to this invention, this time point change can be effected practically without additional expenditures in the circuit design.

Figure 1:
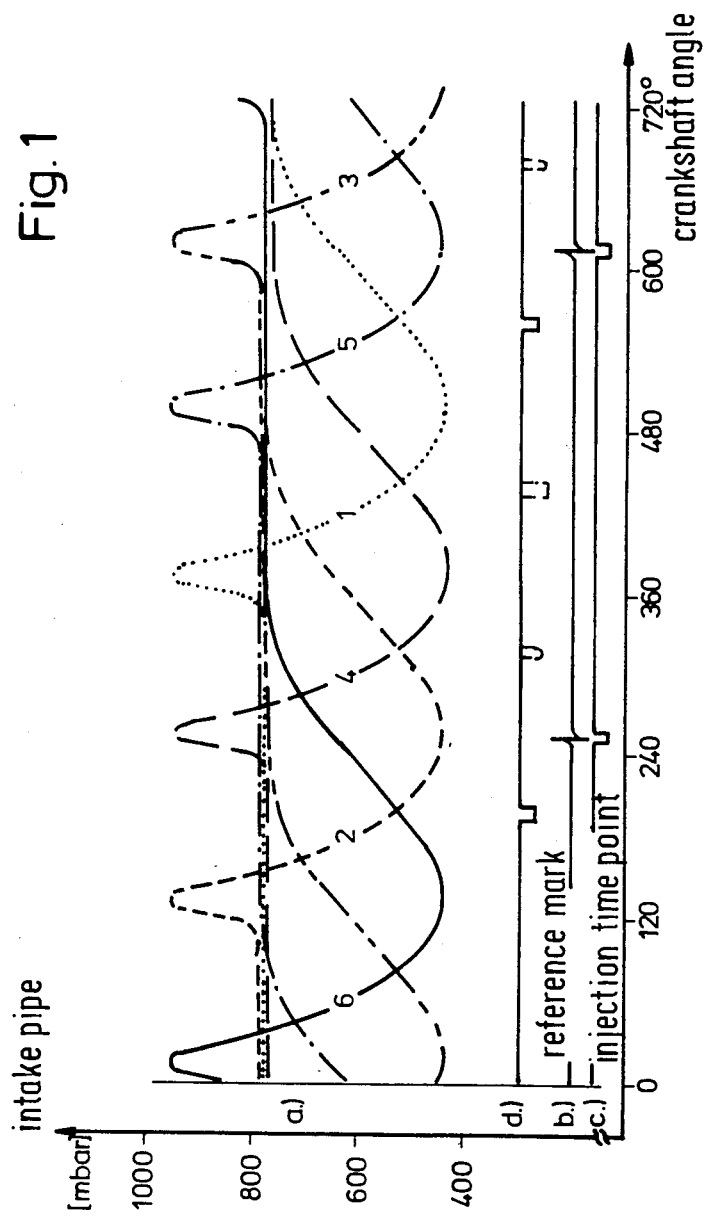
FIG. 1 is a time plot of the courses of pressures in respective intake pipes of cylinders of a six cylinder engine over a work cycle (720° of crankshaft)

Referring to the plot diagram of FIG. 1, it will be seen that the individual courses of intake pipe pressures pertaining to assigned cylinders are subject to distinct fluctuations when viewed over the working cycle (720° of crankshaft angle) of each cylinder. These pressure fluctuations manifest themselves by peaks which at certain crankshaft angles reach almost the pressure of outer atmosphere (960 millibars) and by pressure drops down to 440 millibars. The numeric values which have been added for the sake of clarity differ of course with particular engines and need not be considered in connection with this invention.

The superposed courses of respective intake pipe pressures 1 through 6 in a six cylinder engine are indicated in the plot of FIG. 1 by a. The time plot b indicates the occurrence of reference marks of angular positions of the crankshaft. These reference marks in prior art injection control devices of this kind have determined the injection time points indicated in the plot c. As it has been already explained before, in the prior art method the reference marks have been adjusted to suction strokes of certain cylinders, in this case of cylinders 4 and 3 and have served for introducing common injection start points for all cylinder. In this example, the reference mark corresponds to about 250° and 610° of the crankshaft angle at which time points fuel injection takes place. Momentary intake pipe pressures present at these ignition time points and at these two crankshaft angle values are listed in a table below. The pressures are determined without regard to other tolerances, for a six cylinder engine at an ignition time point 0° crankshaft angle, idling rotary speed $n_{LL}=850$ rpm, and at a fuel line pressure $p_{Kr}=2.9$ bars for the following computation of λ values.

| Cylinder # | $p_{Intake}$ pipe pressures (mbar) at injection time points | | $p_{mean} = \frac{p_1 + p_2}{2}$ (mbar) | Δλ (%) |
|---|---|---|---|---|
| | $p_1$ (mbar) | $p_2$ (mbar) | | |
| 1 | 650 | 780 | 715 | 0.60 |
| 2 | 760 | 440 | 600 | 2.55 |
| 3 | 950 | 770 | 860 | −1.95 |
| 4 | 760 | 960 | 860 | −1.95 |
| 5 | 440 | 780 | 610 | 2.40 |
| 6 | 780 | 650 | 715 | 0.60 |
| | | | | Δλ 4.5% |

For the values in the above table, the value is computed according to the following formula:

$$\Delta\lambda(\%) = \left( \frac{p_{Kr} + (p_{intake} - p_{mean})}{p_{KR}} - 1 \right) \cdot 100$$

wherein $P_{intake}$ corresponds to the mixture pressure of cylinders 1 through 6 applied to pressure regulator via throttle.

Figure 2:
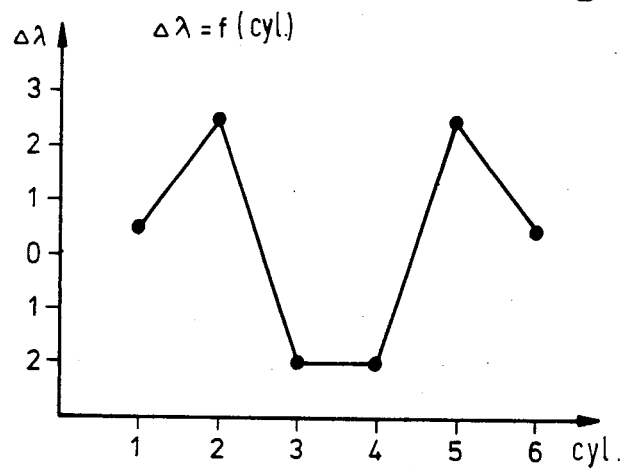
FIG. 2 shows the values of λ-dispersions for individual cylinders in a six cylinder engine equipped with prior art fuel injection systems.

According to FIG. 2, when considering the number of all cylinders, a theoretic relation $$\Delta\lambda = f(cyl)$$

with an absolute measure of variation of 4.5%.

If in a four stroke engine the common fuel injection time point is shifted twice per working cycle of the engine about a certain crankshaft angle which according to FIG. 1, pertains to those angular positions at which the lowest relative intake pressure differences of individual cylinders occur, then the possible λ-dispersion is reduced to a minimum, value. In the plot d in FIG. 1, new possible common injection time points determined in accordance with this invention are indicated in crankshaft angles over a working cycle of the engine. In comparison with conventional common injection time points the new time points are leading by 60° of crankshaft angle or as indicated by dashed lines in the plot d, trailing by 60° or by 180°. It will be seen that the new ingition time points are located always between the ignition time points in conventional control devices. It will be seen that in a six cylinder engine three different possibilities of shifting of the phase of ignition in accordance with this invention can be set so as to achieve a minimum λ-dispersion. In a four cylinder engine two new crankshaft positions for the common injection time points are possible. If after the shifting of the injection time points by the given values and the course of intake pipe pressure for each cylinder in accordance with FIG. 1 is reset in accordance with the beforementioned table of values, then on the basis of otherwise equal reference magnitudes a λ-dispersion of only 2% will result.

| Cylinder # | $P_{intake}$ (mbar) at two ignition time points | | $\frac{p_1 + p_2}{2}$ (mbar) | Δλ (%) |
|---|---|---|---|---|
| | $p_1$ (mbar) | $p_2$ (mbar) | | |
| 1 | 530 | 770 | 650 | 2% |
| 2 | 780 | 530 | 655 | 2% |
| 3 | 790 | 750 | 770 | 0 |
| 4 | 750 | 780 | 765 | 0 |
| 5 | 530 | 780 | 655 | 2% |
| 6 | 780 | 530 | 655 | 2% |
| | | | | Δλ 2% |

Figure 3:
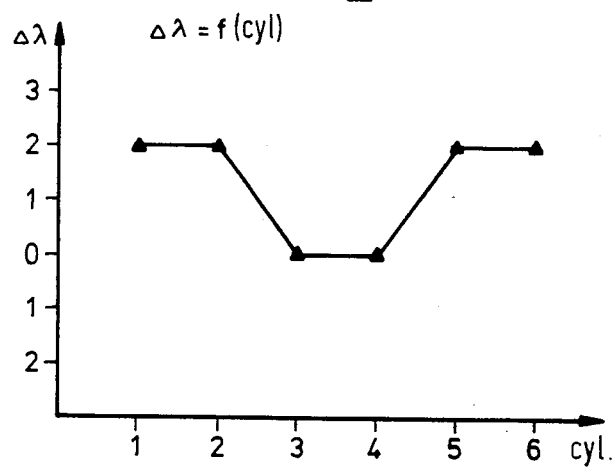
FIG. 3 shows a diagram of reduced values of λ-dispersion in the engine of FIG. 2 equipped with the fuel injection control system of this invention.

In the plot diagram of FIG. 3, this difference of λ values for a six cylinder engine is graphically shown. It will be readily recognized from these diagrams that also in the case of a four cylinder engine in which only the plots pertaining to cylinders 5 and 6 are removed, the same prior art course of λ-dispersion is reduced by this invention in the same manner as in six cylinder engines.

As has already been mentioned before, this invention can be realized with minimum expenditures when in a fuel injection control system operating on digital basis (so-called Motronic) while preserving without change the hardware, only an additional computing function corresponding to block 10 in FIG. 4 is to be provided. In this computing stage 10, a crankshaft angle α0 pertaining to reference mark which can lie for example 100° before the upper dead center, is added to another crankshaft angle α2. In FIG. 4, a sensor or transmitter of rotary speed and crankshaft angle value (n-mark transmitter) or a corresponding function indicated by block 11 is necessary for adding all pulses 12 corresponding to 1.5° increments of crankshaft rotation to produce an angle value α2 which is to be added to the reference mark angle α0. The resulting common injection time point αE is indicated in block c in FIG. 4; in 10 this example the time shift α2 is about 300° of crankshaft angle which in comparison with prior art serial injection time points represents a time shift of about 60° backwards. The reference crankshaft angle α0 for the serial injection time points is already determined in all conventional digital fuel injection control systems and is indicated by the block 13 in FIG. 4.

For using this invention in analog fuel injection systems (L-jetronic) a certain minor modification of the existing analog system is necessary to obtain the additional information about the crankshaft angle. As mentioned before, in digital fuel injection systems this additional crankshaft angle information is obtained without the necessity of any substantial modification.

In FIG. 5. block 15 represents a conventional analog fuel injection system which performs usual functions for the computation of the beginning of fuel injection and duration of fuel injection pulses. The block 15 cooperates with a block 16 which performs the synchronization of fuel injection time points with a reference cylinder. Functional block 17 feeds to the block 16 signals corresponding to the reference crankshaft angle α0. Functional block 18 delivers to the block 16 a signal corresponding to a crankshaft angle α1 which is computed by dividing the angle of 720° of the working cycle of the engine (2 rotations) by the numbers of cylinder of the engine. The angle corresponding to one working cycle is determined for example from the ignition pulses.

The functional block 19 which is connected to the output of the functional block 15 and to the block 17, determines a time shift $t_1$ to an optimum fuel injection time point. This time shift $t_1$ is determined as a function of the rotary speed f(n) of the engine, as indicated in the plot to the right of the block 19. This rotary speed dependent time shift $t_1$ is added to the crankshaft reference angle α0 and the resulting new common injection time point as indicated in plot c in FIG. 5 produces injection time points at which the lowest λ-dispersion occurs.

Plot a in FIG. 5 indicated the signals corresponding to crankshaft angle marks α0; plot b represents ignition pulses; and plot c represents the rotary speed dependent shift of the ignition time points by the value $t_1$ with respect to the crankshaft angle marks in plot a; the resulting common ignition pulses in plot c represent the optimum ignition starts for achieving the minimum λ-dispersion.

It will be understood that each of the elements described above, or two or more together, may also find a useful application in other types of constructions differing from the types described above.

While the invention has been illustrated and described as embodied in specific examples of fuel injection control systems, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A method of controlling fuel injection in a multi-cylinder internal combustion engine having individual throttle valve control means assigned to respective cylinders, and means for injecting fuel into each cylinder at least twice at predetermined crankshaft angles during a complete working cycle of the cylinder, comprising the steps of measuring effective differential pressures in respective intake pupes of the engine, and shifting the time point of the injection start common to all cylinders relative to the start points of respective strokes in the working cycle, to an angular position of the crankshaft at which effective differential pressures in the intake pipes have mininum deviations from each other.

2. A method as defined in claim 1, wherein the working cycle includes suction, compression, explosion and discharge strokes and wherein in the case of a six cylinder engine the common time point is shifted about 60° forward or backward relative to 0°, 120°, 340° and so on throughout the entire working cycle of the 720° of the crankshaft referred to the suction stroke of one cylinder.

3. A method as defined in claim 1, wherein said engine is a four cylinder engine and said shifting of the common ignition time point amounts to 90° relative to 0°, 180°, 360° and so on throughout the entire working cycle of 720° referred to the suction stroke of one cylinder.

4. A device for controlling fuel injection in a multicylinder internal combustion engine having individual throttle valve control means assigned to respective cylinders and means for injecting fuel in each cylinder at least twice at predetermined crankshaft angles during the entire working cycle of the cylinder, comprising digitally operating means for determining a reference crankshaft angle $\alpha 0$ corresponding to a conventional fuel injection time point, means for measuring effective differential pressures in intake pipes of the engine, means for adding predetermined crankshaft angle increments to obtain an additional crankshaft angle $\alpha 2$ at which the measured pressure differentials of all cylinders are approximately equal, and means for shifting the reference crankshaft angle $\alpha 0$ by the value of the additional crankshaft angle $\alpha 2$ to obtain a new common ignition time point in which $\lambda$-values exhibit minimum dispersion.

5. A device for controlling fuel injection in a multicylinder internal combustion engine having individual throttle valve control means assigned to respective cylinders, means for injecting fuel in the cylinders at predetermined angular positions on the crankshaft at least twice during a working cycle of the engine, said injecting means including means for determining a reference crankshaft angle $\alpha 0$, means for measuring differential pressures in intake pipes of the engine, means for computing a time shift of the reference crankshaft angle $\alpha 0$ in dependency on the rotary speed of the engine and on the measured effective suction pipe pressure differentials to obtain a new common ignition time point at which pressure differentials of all cylinders are approximately equal.

* * * * *